(No Model.)
A. KAMPF.
HYDRAULIC RECOIL BRAKE FOR GUNS.
No. 500,908. Patented July 4, 1893.
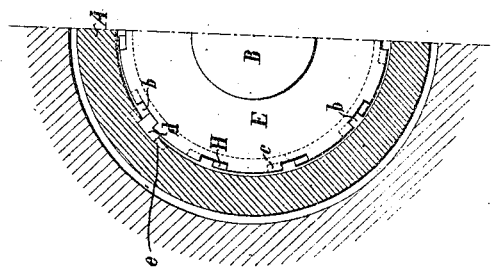
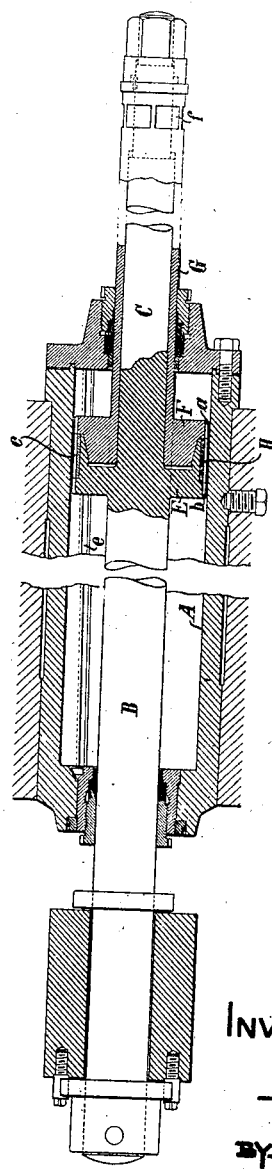
WITNESSES.
Walter E. Allen
Edward R. Knight
INVENTOR.
August Kampf.
BY Knight Bros.
ATTORNEYS.

United States Patent Office.

AUGUST KAMPF, OF MAGDEBURG, GERMANY, ASSIGNOR TO THE GRUSONWERK, OF SAME PLACE.

HYDRAULIC RECOIL-BRAKE FOR GUNS.

SPECIFICATION forming part of Letters Patent No. 500,908, dated July 4, 1893.

Application filed December 27, 1892. Serial No. 456,373. (No model.)

*To all whom it may concern:*

Be it known that I, AUGUST KAMPF, of Magdeburg, in the Kingdom of Prussia and German Empire, have invented new and useful Improvements in Hydraulic Recoil-Brakes for Guns, of which the following is a specification, reference being had therein to the accompanying drawings.

This invention relates to a simplified construction of hydraulic recoil brakes for guns.

The kind or class of hydraulic brake to which this invention relates is that wherein the liquid is forced during the recoil, from one end of the brake cylinder to the other end, past a piston, through one or more channels the sectional area of which is or may be contracted as the recoil progresses for the purpose of producing a constant resistance. In the present brake the said channels are formed in the brake piston itself.

An important feature of the said invention relates to the manner of and means for contracting the channel or channels as the recoil progresses, and also for adjusting initially the size of said channels.

In order that the invention may be readily understood I will now proceed to describe the same with reference to the accompanying drawings, in which—

Figure 1 is a longitudinal central section through the brake cylinder, and Fig. 2 is a half transverse section drawn to a larger scale.

Like letters denote corresponding parts in both figures.

As shown in the drawings the brake comprises a cylinder A in which moves a piston provided with two piston rods B, C, which project through packed glands in opposite ends of the cylinder and are connected with the recoiling part of the gun-carriage, the cylinder being connected with the fixed part of the same. Or the cylinder may recoil and the piston be held stationary, as only the movement of the piston relatively to the cylinder is material. The piston consists of two parts E and F which are formed respectively with male and female coned parts that fit together and make a tight joint. The part F is formed with or secured to a tube G which is loose upon the solid piston rod C so that this tube can be turned on the latter. The said part F is provided in its cylindrical periphery with longitudinal grooves $a$ which when properly adjusted are opposite similar grooves $b$ formed in the part E.

A portion of the periphery of the part E is reduced in diameter to receive a ring H mounted loosely thereon, said ring being maintained in position by the part F of the piston. Longitudinal grooves $c$ are formed in the ring H to correspond with the grooves $a\,b$ in the parts F E. On the said ring H are also formed or fixed one or more lugs $d$ which protrude beyond the periphery of the ring and are adapted to engage with and move in corresponding grooves $e$ formed in the wall of the cylinder. These grooves $e$ have a certain amount of twist, that is to say, they are spiral, having a very long pitch so that the disk H is caused during the recoil to turn slightly relatively to the piston which does not turn. In this manner the channels, which allow the passage of the liquid from one side of the piston to the other, are gradually contracted as the recoil progresses and by the selection of the proper form for the grooves $e$ and the recesses $a\,b\,c$ the sectional area of the orifice available for the passage of the liquid may for each position of the piston in the cylinder be made to correspond with the velocity of the gun at that part of the recoil, so that the resistance will be uniform. As however, when determining the sectional area of the channels, several factors cannot be taken into account with sufficient accuracy, such for example as the coefficient of contraction of the liquid in the channels, and the frictional resistances in the brake itself and in the gun carriage it is desirable that the sectional areas be adjustable according to requirements, in order that the recoil may be as great as possible, but in no case greater than the entire stroke of the piston. Such an adjustability is obtained in the described arrangement in a simple manner by adjusting the tube G, which for this purpose is constructed at $f$ of a form adapted to be engaged by a wrench whereby the tube can be turned. If in the initial position of the piston, that is to say, before the commencement of the recoil, the recesses $a$ are not exactly opposite the recesses $b$, but are put back a little in the opposite direction to that of the turning movement of the disk H during the recoil, the sectional area of the orifice is from the beginning somewhat smaller and the complete closing of the same takes place a little earlier so that the resistance is increased. By turning the said tube G in one or the other direction, the resistance may be increased or diminished according to requirements above the limit determined by the size of the orifice.

Having described my invention, what I claim, and desire to secure by Letters Patent, is—

1. A hydraulic brake for guns consisting of a cylinder, and a piston formed of two relatively rotatable parts having longitudinal passages adapted to register, as and for the purpose explained.

2. A hydraulic brake for recoil guns consisting of a cylinder, and a piston formed of two relatively rotatable parts having channels adapted to register; said cylinder being provided with a groove or guide in which one of said parts engages, and which is inclined to the stroke for rotating said part, as and for the purpose explained.

3. In a hydraulic brake for gun carriages, the combination of a suitable cylinder, a transversely divided piston, the parts of which are provided with grooves or channels adapted to register, and a ring also provided with grooves or channels fitting on one of the parts of said piston and adapted to be automatically rotated thereon for gradually closing the channels in the piston during the recoil of the gun, substantially as set forth.

4. In a hydraulic brake for guns, the combination of the cylinder, the piston, working in said cylinder, formed in two parts provided with grooves or channels adapted to register, and arranged for relative rotation, and the guide and lug on the cylinder and piston for causing such rotation, as and for the purpose explained.

5. In a hydraulic brake for guns, the combination of the cylinder formed with an inner cam groove, a piston working in said cylinder formed in two relatively rotatable parts provided with grooves or channels adapted to register, and a ring also provided with grooves or channels fitting on one of said parts, and having a lug fitting in the spiral cam groove, substantially as and for the purpose set forth.

6. In a hydraulic brake for guns, the combination of the cylinder, and a piston working in said cylinder, formed in two relatively rotatable parts with longitudinal apertures adapted to register, and having concentric stems projecting from the cylinder, one of said piston stems being adapted for connection for controlling the recoil of the gun, and the other having a wrench seat formed on it, substantially as and for the purpose explained.

AUGUST KAMPF.

Witnesses:
HERMANN LUBOWSKI,
EMIL KALLNECKER.